（12) United States Patent
Oakley

(10) Patent No.: US 7,057,888 B2
(45) Date of Patent: Jun. 6, 2006

(54) RETRACTABLE AND EXTENDABLE CAMERA AND MICROPHONE ARRAY COMPUTER SYSTEM

(75) Inventor: Nicholas W. Oakley, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 58 days.

(21) Appl. No.: 10/948,522

(22) Filed: Sep. 22, 2004

(65) Prior Publication Data

US 2006/0061962 A1 Mar. 23, 2006

(51) Int. Cl.
*G06F 1/16* (2006.01)

(52) U.S. Cl. ..................... 361/681; D14/317
(58) Field of Classification Search ........... 361/681; D14/317

See application file for complete search history.

(56) References Cited

U.S. PATENT DOCUMENTS

| D363,471 S | * | 10/1995 | Shima et al. ............... D14/317 |
| 5,661,270 A | * | 8/1997 | Bozorgi-Ram ............... 181/129 |
| 5,768,163 A | * | 6/1998 | Smith, II ..................... 348/373 |
| 5,801,919 A | * | 9/1998 | Griencewic ................. 361/681 |
| 5,880,928 A | * | 3/1999 | Ma ............................. 361/681 |
| 6,812,958 B1 | * | 11/2004 | Silvester ..................... 348/375 |
| 2002/0093493 A1 | * | 7/2002 | Michaeli et al. ............ 345/173 |

\* cited by examiner

*Primary Examiner*—Lisa Lea-Edmonds
(74) *Attorney, Agent, or Firm*—David N. Tran

(57) ABSTRACT

A computer system includes one or more panels that are retractable or extendable relative to a display housing. The one or more panels include a panel located at proximally a top edge of the display housing and including an image capturing device. The one or more panels also include a panel located at proximally a left edge and a panel located at proximally a right edge of the display housing and each including one or more sound capturing devices. The one or more panels are synchronously retracted or extended relative to the display housing.

12 Claims, 7 Drawing Sheets

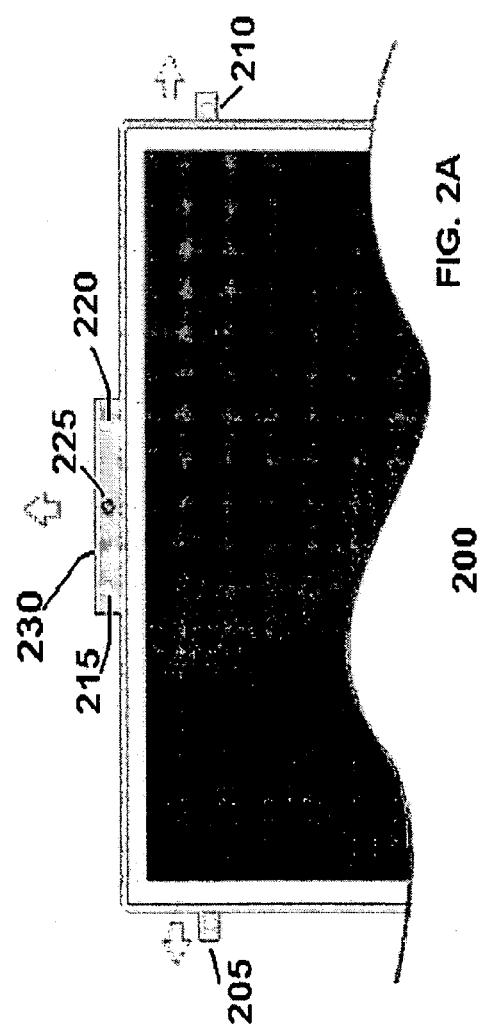
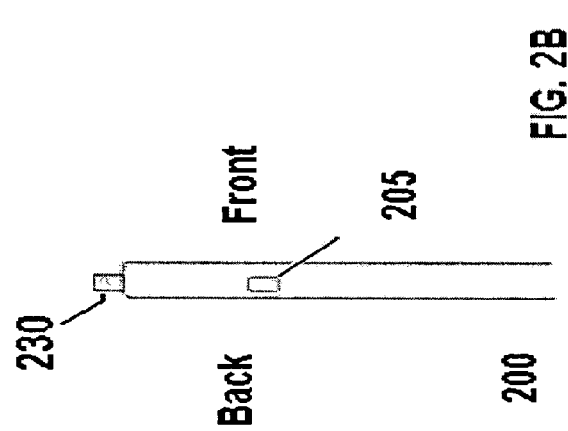

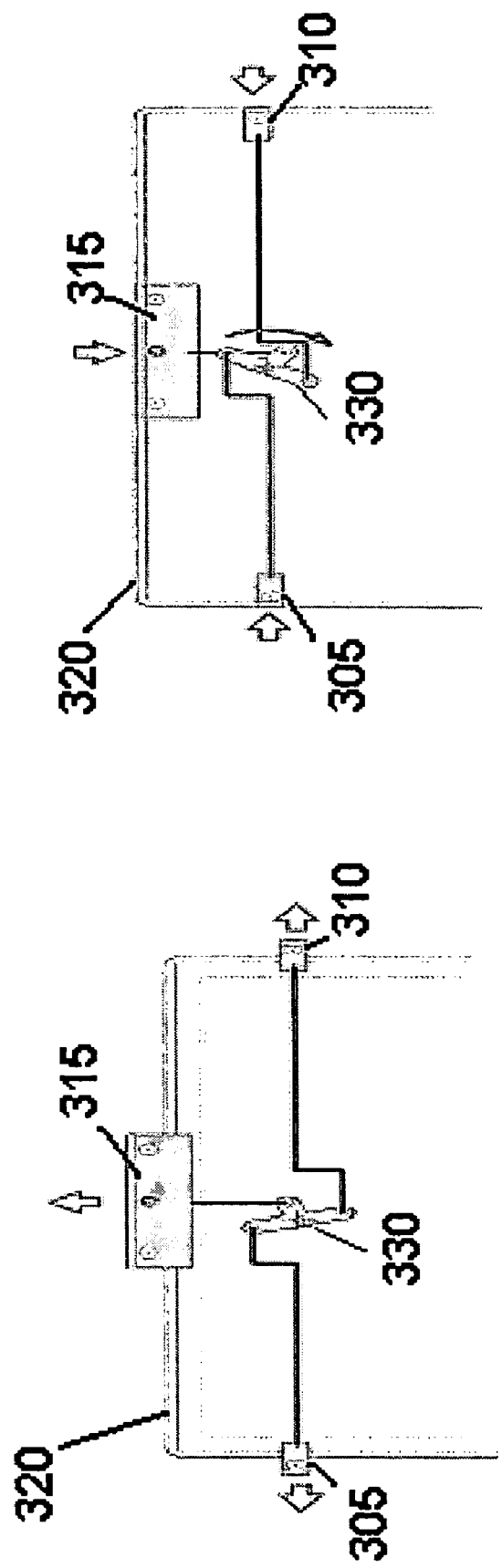

RETRACTABLE AND EXTENDABLE CAMERA AND MICROPHONE ARRAY COMPUTER SYSTEM

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD OF THE INVENTION

The present invention generally relates to the field of computer systems and more particularly related to computer systems having video and audio applications.

BACKGROUND

Desktop computers are normally heavy comparing to notebook (also called laptop or mobile) computers. A desktop computer typically includes a separate display unit or monitor connected to a system or base unit via a display cable. Notebook computers on the other hand are typically light and compact and are becoming more popular in recent years. One advantage of notebook computers is their ease of mobility. The lighter weight and the compact size together with the long battery life have made the use of notebook computers more commonplace. Although the light weight and the dependency on battery life mean that the notebook computers may not be equipped with as many features as their larger desktop siblings, the processing power of the notebook computers is becoming increasingly faster.

As the processing power of the desktop and the notebook computers increases, more advanced applications may become available. These more advanced applications may utilize different components, interfaces, etc. to improve user experience and productivity. Some examples of applications may include video conferencing applications, video phone applications, voice over Internet Protocol (VoIP) applications, image and voice recognition applications, etc. To support these applications, some of the issues that may need to be addressed by computer manufacturers include thermal management, battery life, form factor, etc.

BRIEF DESCRIPTION OF THE DRAWINGS

The invention is illustrated by way of example and not limitation in the figures of the accompanying drawings, in which like references indicate similar or identical elements, and in which:

FIGS. 2B and 2B illustrate front view and side view examples of a display housing having a retractable and extendable panel toward a top edge and a retractable and extendable panel each toward a left edge and a right edge, in accordance with one embodiment.

FIGS. 3A and 3B illustrate one example of a mechanism that may be used to synchronize the retraction and extension of the panels, in accordance with one embodiment.

DETAILED DESCRIPTION

For one embodiment, a computer system having a retractable and extendable image capturing device is disclosed. The image capturing device may be coupled to a panel. The panel may be coupled to a display enclosure or housing and may be retracted into or extended from the display housing. The image capturing device may be activated when the panel is extended from the display housing. The image capturing device may be deactivated when the panel is partially or wholly retracted into the display housing.

In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "for one embodiment" in various places in the specification are not necessarily all referring to the same embodiment.

Overview

Figure 1:
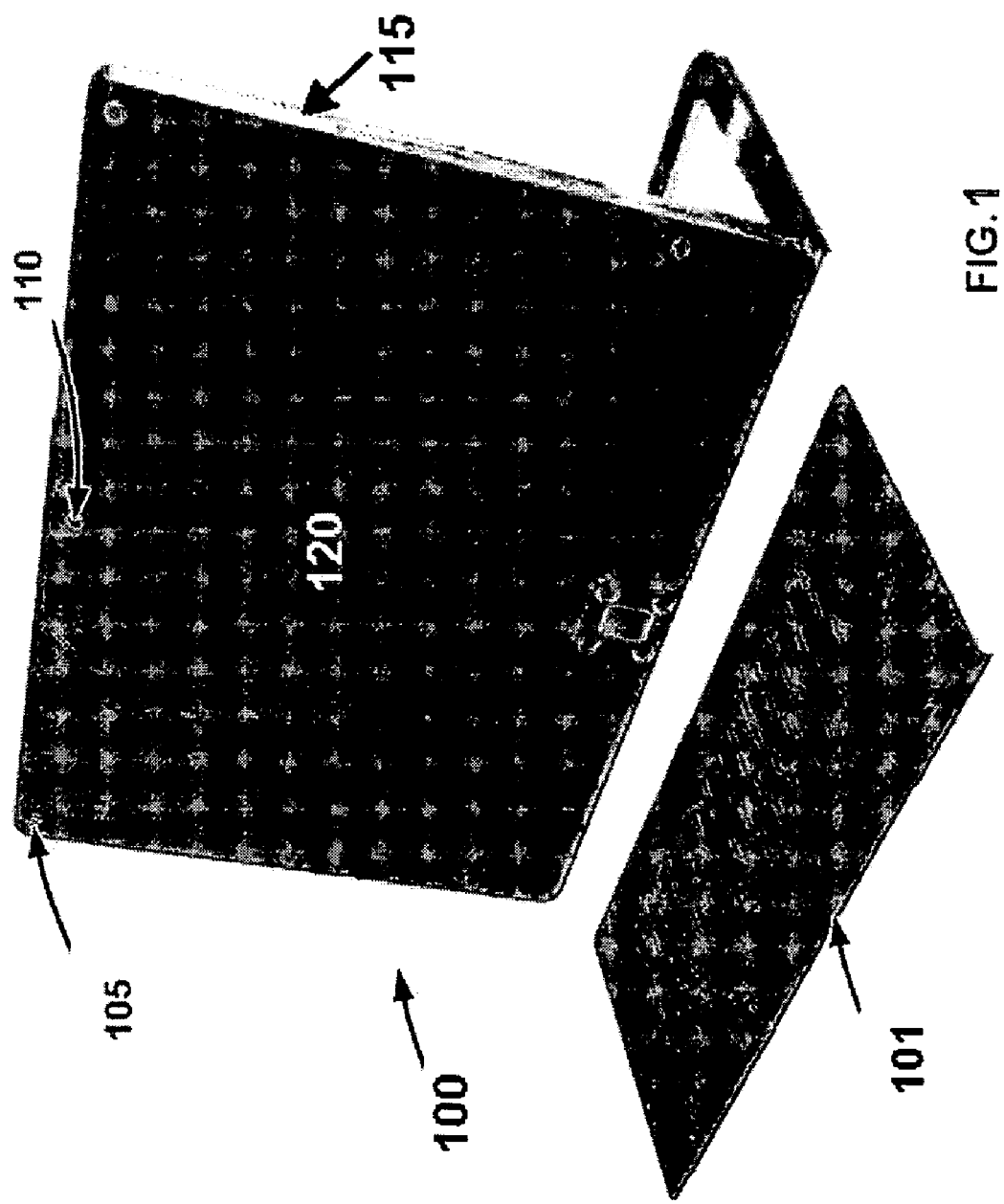
FIG. 1 illustrates an example of a computer system, in accordance with one embodiment.

FIG. 1 illustrates one example of a computer system, in accordance with one embodiment. Computer system 100 may include a keyboard 101 and display enclosure or housing 115. The display housing 115 may be generally flat and may include a front side (as shown) and a back side (not shown) with sufficient displacement in between to accommodate many electronic components, circuit boards and the like. For example, the display housing 115 may include a central processor, communications devices, storage devices, etc.

The display housing 115 includes a top edge, a left edge, a right edge and a bottom edge. The display housing 115 may also include a display screen 120 which may be, for example, a liquid crystal display (LCD) or a display using any other display technologies. For one embodiment, the display housing 115 may include an image capturing device 110 and one or more sound capturing devices such as, for example, the sound capturing device 105. For example, the image capturing device 110 may be a digital camera, a video camera, etc., and the sound capturing device 105 may be a microphone, etc. The image capturing device 110 and the sound capturing device 105 may be used by different applications to enhance user experience, productivity, etc. when using the computer system 100.

Retractable and Extendable Top Panel

FIGS. 2B and 2B illustrate a front view and a side view respectively of a display housing having a retractable and extendable panel toward a top edge, in accordance with one embodiment. Referring to FIG. 2A, display housing 200 may include a top insert or panel referred to as a top panel 230 located generally near a top edge of the display housing 200. The top panel 230 may be retractable relative to the display housing 200. The top panel 230 may also be extendable relative to the display housing 200 along the direction shown by the arrow next to the top panel 230. For example, the display housing 200 may include an opening or a slot to accommodate the top panel 230. For one embodiment, the top panel 230 may be retracted into and extended from the display housing 200 in between a displacement between a front and a back of the display housing 200, as illustrated in FIG. 2B.

Top Panel with Image and Sound Capturing Devices

For one embodiment, the top panel 230 may include an image capturing device 225. The image capturing device 225 may be a still-image camera, a video camera, or any other types of camera that enable capturing an image of an area that the camera is directing to. For one embodiment, the image capturing device 225 may be activated when the top panel 230 is partially or wholly deployed or extended relative to the display housing 200, as illustrated in FIG. 2A. The image capturing device 225 may be deactivated when the top panel 230 is partially or wholly retracted relative to the display housing 200. For example, the image capturing device 225 may be used to detect user presence or to authenticate a user for access. In this example, the computer system associated with the display housing 2000 may include biometric recognition software to authenticate a user for access without the usual requirement of a user identification number and a password. For one embodiment, the image capturing device 225 may be controlled by software to point at different angles.

For one embodiment, the top panel 230 may also include one or more sound capturing devices. For example, the top panel 230 may include two sound capturing devices 215 and 220. The sound capturing devices 215 and 220 may be microphones or any other types of devices that may enable capturing sound based on the position of the top panel 230. For one embodiment, the sound capturing devices 215 and 220 may be activated when the top panel 230 is extended relative to the display housing 200. The sound capturing devices 215 and 220 may be deactivated when the top panel 230 is partially or wholly retracted relative to the display housing 200.

Retractable and Extendable Edge Panels

For one embodiment, the display housing 200 may include a side insert or panel located generally near a left edge of the display housing 200 and is referred to as a left panel 205. The display housing 200 may also include another side insert or panel located generally near a right edge of the display housing 200 and is referred to as a right panel 210, as illustrated in FIG. 2A. For one embodiment, the left panel 205 and the right panel 210 may be retracted relative to the display housing 200 and may be extended relative to the display housing 200 along the direction shown by the arrow next to the left panel 205 and next to the right panel 210, respectively. For example, the display housing 200 may include a slot along its left edge and a slot along its right edge to accommodate the left panel 205 and the right panel 210, respectively. For one embodiment, the left panel 205 and the right panel 210 may be retracted into and extended from the display housing 200 in between a displacement between the front and the back of the display housing 200, as shown in FIG. 2B.

Edge Panels with Sound Capturing Devices

For one embodiment, each of the left panel 205 and the right panel 210 may include one or more sound capturing device (not shown). These sound capturing devices may be microphones or any other types of devices that enable capturing sound based on the position of the left panel 205 and the right panel 210, respectively. For one embodiment, the sound capturing devices located in the left panel 205 and in the right panel 210 may be activated when the left panel 205 or the right panel 210 is partially or wholly extended from the display housing 200. The sound capturing devices located in the left panel 205 or in the right panel 210 may be deactivated when the left panel 205 or the right panel 210 is partially or wholly retracted into the display housing 200.

The multiple sound capturing devices in the top panel 215, left panel 205 and right panel 210 form an array of sound capturing devices and may enable picking up sound from various angles in front of the display housing 200. The array of sound capturing devices may also enable approximating a location of a sound source and to control the image capturing device 225 to point in the direction of the sound source. The array of sound capturing devices may enable a user to give voice commands. By spreading the sound capturing devices at different places on the display housing 200, acoustic clarity may be attained. The combination of the image capturing device 225 and the array of sound capturing devices may enable a user to have hands free interactions with the computer system associated with the display housing 200.

Synchronous Movement

For one embodiment, the top panel 230, the left panel 205 and the right panel 210 may be individually deployed or extended from the display housing 200. For example, a separate push-pull mechanism (not shown) may be used with each of the panels 230, 205, 210. Similarly, they may also be individually retracted. For one embodiment, the top panel 230, the left panel 205 and the right panel 210 may be deployed in a synchronous manner. For example, using a one touch operation, all three panels may be retracted into or extended from the display housing 200 at about the same time.

FIGS. 3A and 3B illustrate one example of an arrangement that may be used to enable synchronous movement of the panels, in accordance with one embodiment. In this example, a bellcrank 330 may be used in conjunction with a push-pull mechanism (not shown) associated with top panel 315. For example, when all three panels 315, 305, and 315 are retracted into the display housing 320, applying pressure to the push-pull mechanism may cause the top panel 315 to rise or extend from the top edge of the display housing 320. As the top panel 315 rises, it rotates the bellcrank 330 counter-clockwise, thus extending the left panel 305 and the right panel 315 from the display housing 320, as illustrated in FIG. 3A. Applying pressure to the push-pull mechanism again may cause the top panel 315 to withdraw or retract into (in the direction shown by the arrows) the display housing 320. As the top panel 315 withdraws, it rotates the bellcrank 330 clockwise, thus retracting the panels 305 and 315 into the display housing 320, as illustrated in FIG. 3B.

Figure 4A:
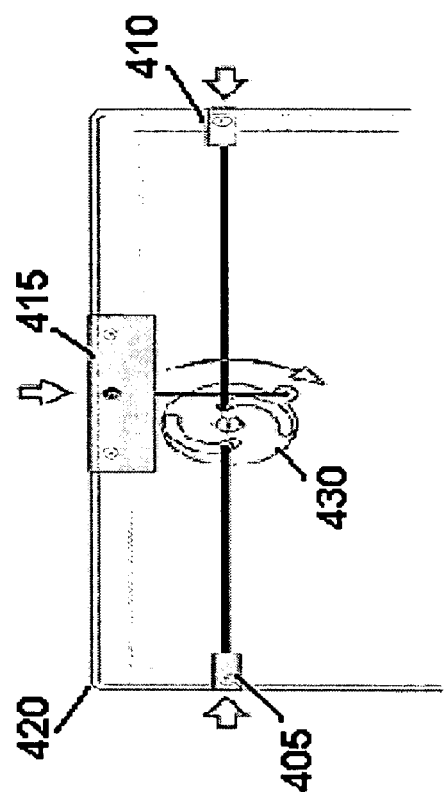
FIGS. 4A and 4B illustrate a second example of a mechanism that may be used to synchronize the retraction and extension of the panels, in accordance with one embodiment.
Figure 4B:
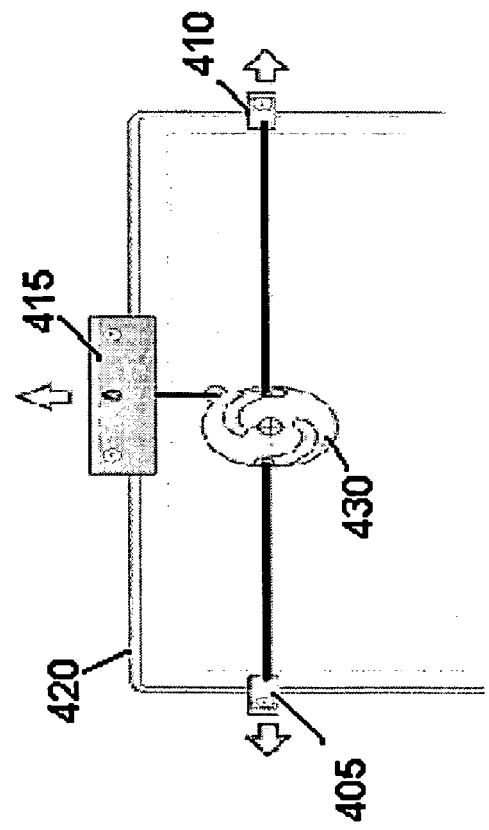

FIGS. 4A and 4B illustrate another example of an arrangement that may be used to enable synchronous movement of the panels, in accordance with one embodiment. In this example, a cam 430 may be used in conjunction with a push-pull mechanism (not shown). The push-pull mechanism may be associated with top panel 415. Alternatively, the push-pull mechanism may be associated with the left panel 405 or the right panel 410. For example, when all three panels 415, 405, and 410 are retracted into the display housing 420, applying pressure to the push-pull element may cause the top panel 415 to rise or extend from the top edge of the display housing 420. As the top panel 415 rises, it rotates the cam 430 anti-clockwise, thus extending the panels 405 and 415 from the display housing 420, as illustrated in FIG. 4A. Applying pressure to the push-pull element again may cause the top panel 415 to withdraw or retract into (in the direction shown by the arrows) the display housing 420. As the top panel 415 withdraws, it rotates the cam 430 clockwise, thus retracting the panels 405 and 415 into the display housing 420, as illustrated in FIG. 4B.

Figure 5B:
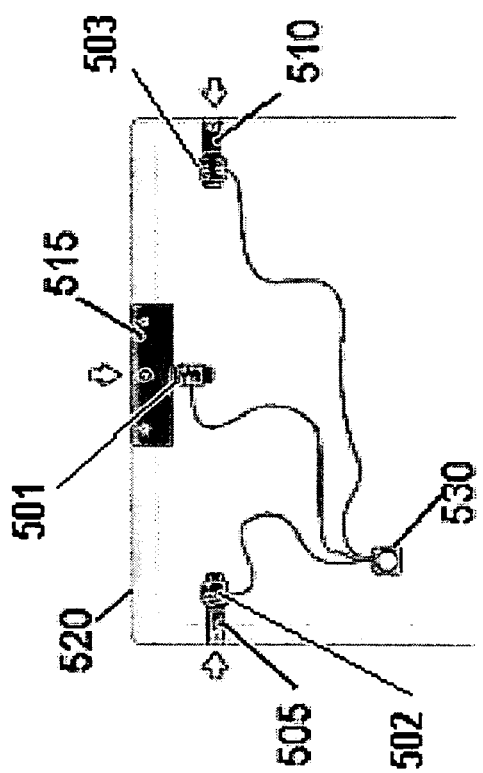
FIGS. 5A and 5B illustrate a third example of a mechanism that may be used to synchronize the retraction and extension of the panels, in accordance with one embodiment.
Figure 5A:
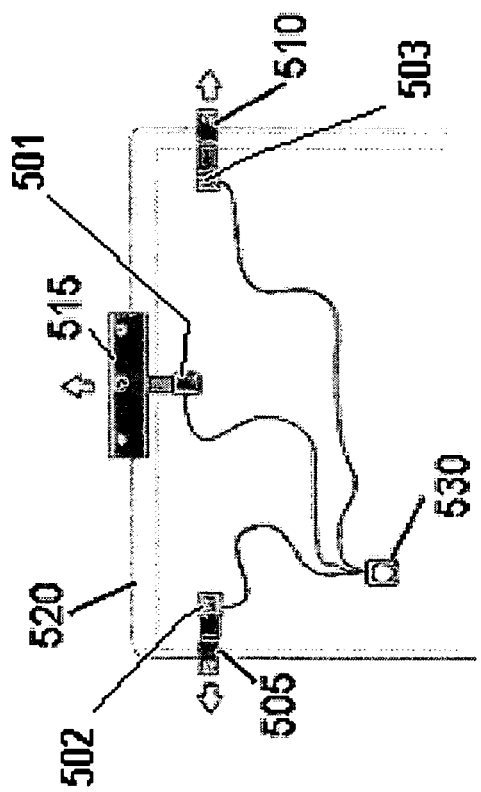

FIGS. 5A and 5B illustrate another example of an arrangement that may be used to enable synchronous movement of the panels, in accordance with one embodiment. In this example, a switch 530 may be used in conjunction with multiple solenoids 501, 502, 503, each connected to a top panel 515, a left panel 505 and a right panel 510, respectively. The switch 530 may need to be a flip, a slider, etc. so that a user can select, for example, "extend" or "retract" to extend or retract all of the panels relative to the display housing 520, as illustrated.

Figure 6B:
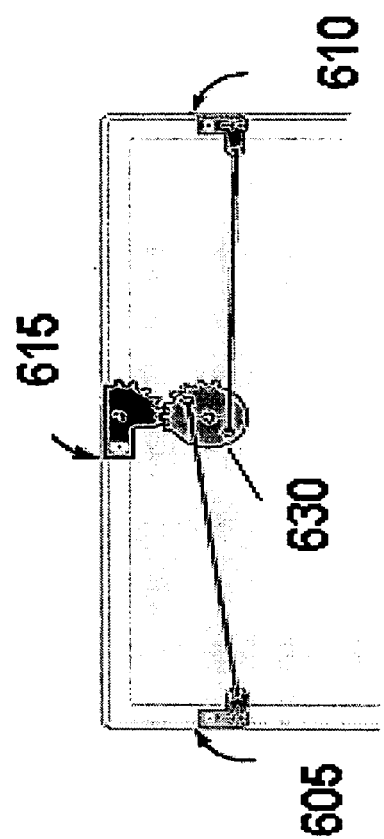
FIGS. 6A and 6B illustrate a fourth example of a mechanism that may be used to synchronize the retraction and extension of the panels, in accordance with one embodiment.
Figure 6A:
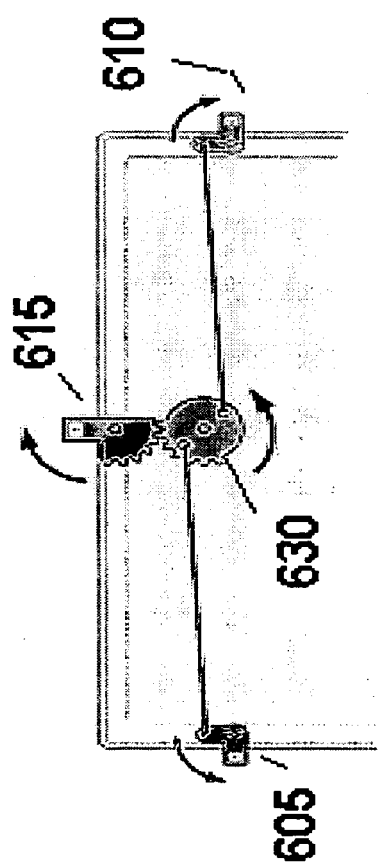
Figure 7:
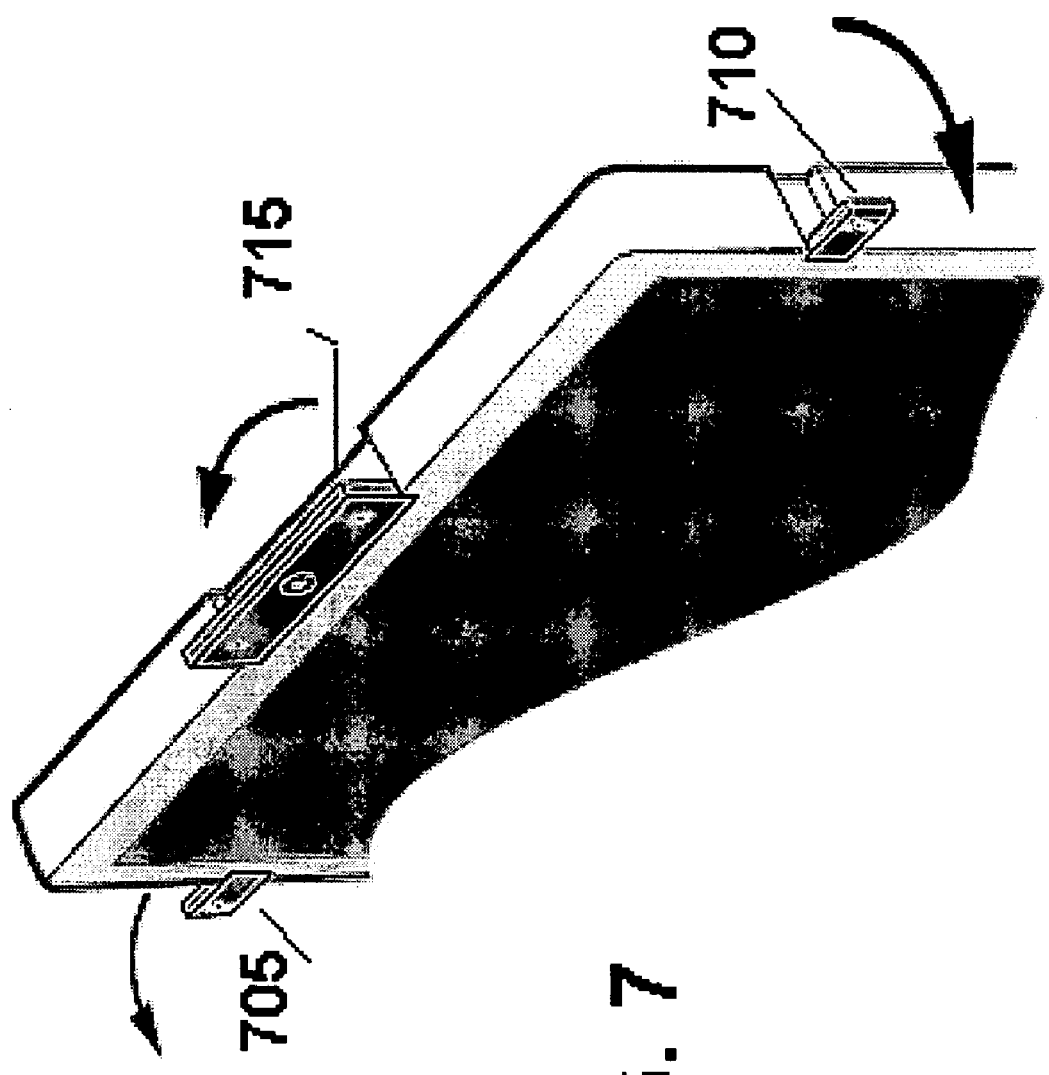
FIG. 7 illustrates one example of panels folding along the edges of the display housing, in accordance with one embodiment.

Although the examples provided above refer to a top panel, and left panel and a right panel, embodiments of the present invention may include additional panels coupled to the displaying housing and having one or more image capturing devices and one or more sound capturing devices. For one embodiment, as illustrated in an example in FIGS. 6A and 6B, the panels 605, 610, and 615 may rotate clockwise or counter-clockwise relative to the display housing 200 using a wheel mechanism 630. For another embodiment, as illustrated in an example in FIG. 7, the panels 705, 710, and 715 may, instead of retracting into the display housing may fold backward or forward along the edges of the display housing using hinge mechanisms (not shown). Although not shown, the panels 705, 710, and 715 may also fold backward and forward relative to the back side of the display housing.

Although the present invention has been described with reference to specific exemplary embodiments, it will be evident that various modifications and changes may be made to these embodiments without departing from the broader spirit and scope of the invention as set forth in the claims. For example, other mechanisms may be used to raise or to lower the panels as described above. For another example, the size of the panels described above may vary as long as they are able to accommodate an image capturing device and or one or more sound capturing devices. Accordingly, the specification and drawings are to be regarded in an illustrative rather than a restrictive sense.

What is claimed is:

1. An apparatus, comprising:
    a display housing having a display screen;
    a first panel coupled to the display housing at proximally a top edge of the display housing, the first panel retractable and extendable relative to the display housing;
    an image capturing device coupled to the first panel, the image capturing device being visible when the first panel is extended relative to the display housing and not being visible when the first panel is retracted relative to the display housing; and
    one or more side panels coupled to the display housing at one or more side edges of the display housing, the one or more side panels retractable and extendable synchronously with the first panel relative to the housing.

2. The apparatus of claim 1, further comprising one or more sound capturing devices coupled to the first panel.

3. The apparatus of claim 1, wherein the one or more side panels include a second panel at proximally a left edge of the display housing and a third panel at proximally a right edge of the display housing.

4. The apparatus of claim 3, wherein each of the second panel and the third panel includes one or more sound capturing devices.

5. An apparatus, comprising:
    a display housing having a display screen and sufficient displacement between a front of the display housing and a back of the display housing to at least partially accommodate retraction and extension of a first panel, a second panel, and a third panel relative to the display housing,
        wherein the first panel includes an image capturing device and one or more sound capturing devices, and
        wherein the second panel and the third panel each includes one or more sound capturing devices,
        wherein the first panel, the second panel and the third panel are retracted or extended relative to the display housing in a synchronous manner.

6. The apparatus of claim 5, wherein the first panel is coupled to the display housing at proximally a top edge of the display housing.

7. The apparatus of claim 6, wherein the second panel and the third panel are coupled to the display housing at proximally at a left edge and a right edge of the display housing, respectively.

8. The apparatus of claim 7, wherein the image capturing device and the sound capturing devices are activated when the first panel, the second panel and the third panel are extended relative to the display housing.

9. The apparatus of claim 8, wherein the image capturing device is controllable to capture an image in different directions.

10. A system, comprising:
    a processor; and
    a display screen coupled to the processor and included in a display housing, the display housing having one or more panels retractable and extendable relative to the display housing, wherein the one or more panels are located proximally near one or more edges of the display housing and are to include an image capturing device and one or more sound capturing devices, and wherein the one or more panels are to be retracted or extended synchronously relative to the display housing.

11. The system of claim 10, wherein the one or more panels include a first panel located at proximally a top edge of the display housing, the first panel including the image capturing device.

12. The system of claim 11, wherein the one or more panels include a second panel and a third panel located at proximally at a left edge and a right edge of the display housing, respectively, wherein each of the second panel and the third panel is to include one or more sound capturing devices.

* * * * *